(12) United States Patent
Wang (10) Patent No.: US 6,693,912 B1
(45) Date of Patent: Feb. 17, 2004

(54) NETWORK INTERCONNECTING APPARATUS AND ACTIVE QUALITY-OF-SERVICE MAPPING METHOD

(75) Inventor: Cai Dong Wang, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/542,872

(22) Filed: Apr. 4, 2000

(30) Foreign Application Priority Data

Jun. 4, 1999 (JP) ............................................. 11/157619

(51) Int. Cl.⁷ .............................................. H04L 12/66
(52) U.S. Cl. ......................................... 370/401; 370/466
(58) Field of Search ............................... 370/389, 395.1, 370/395.21, 395.6, 401, 402, 404, 466; 709/230, 246, 249

(56) References Cited

U.S. PATENT DOCUMENTS 5,701,465 A  * 12/1997 Baugher et al. ............... 707/10
6,175,569 B1 *  1/2001 Ellington et al. ........... 370/401
6,223,222 B1 *  4/2001 Fijolek et al. ............... 709/227
6,415,313 B1 *  7/2002 Yamada et al. ............. 709/200
6,430,154 B1 *  8/2002 Hunt et al. ............... 370/230.1
6,519,254 B1 *  2/2003 Chuah et al. ................ 370/389

* cited by examiner

Primary Examiner—Ricky Ngo
Assistant Examiner—Michael I McLoughlin
(74) Attorney, Agent, or Firm—Venable LLP; Michael A. Sartori (57) ABSTRACT

When a connection passes through two communication networks that guarantee quality of service in different ways, an active packet is sent from one network to the other. Quality of service in the one network is mapped to quality of service in the other network by execution of a program included in the active packet, at the entry node of the other network. End-to-end quality of service is thereby guaranteed, unnecessary exchanges of quality-of-service information are avoided, and each network can modify its quality-of-service practices at its own convenience.

22 Claims, 12 Drawing Sheets

NETWORK INTERCONNECTING APPARATUS AND ACTIVE QUALITY-OF-SERVICE MAPPING METHOD

BACKGROUND OF THE INVENTION

The present invention relates to a method and apparatus for mapping quality of service in one communication network to quality of service in another communication network.

Communication networks are often interconnected so that users of different networks can communicate with one another. The Internet is a familiar example. Many enterprises also have intranets in which a backbone network is linked to a plurality of local area networks, mobile communication networks, and the like.

For many types of communication, a certain quality of service (commonly abbreviated QoS) must be provided. Different networks have different methods of defining and implementing quality of service, so when a communication link passes through several networks, it is not easy to provide an end-to-end QoS guarantee. A conventional method is to use look-up tables, referred to as QoS mapping tables, to translate quality of service in one network to quality of service in another network, but there are certain problems involved in this method.

One problem is that QoS technology is constantly evolving, and new QoS standards or techniques are rarely introduced into all relevant networks simultaneously. Each time the QoS practices in a network are changed, the QoS mapping tables in that network and the networks with which it communicates must be updated. A significant amount of communication bandwidth must be devoted to exchanges of QoS information, just to keep different networks informed of each other's QoS methods, protocols, parameters, and so on. A particular problem is that QoS information must be provided in advance, before it is actually needed. Network bandwidth is sometimes consumed by exchanges of QoS information that will never be needed.

Another problem is that some of the QoS information in a network tends to change dynamically. It is extremely difficult for a QoS mapping table, which is a collection of essentially static information, to cope with a dynamically changing QoS environment in another network.

Yet another problem is that an end user with special QoS requirements may find that these requirements cannot be met satisfactorily, because of restrictions rigidly embedded in the QoS mapping tables.

SUMMARY OF THE INVENTION

An object of the present invention is to provide a QoS mapping method that is timely and efficient.

Another object of the invention is to provide end users with control over QoS mapping.

The invented QoS mapping method comprises the steps of:
  generating a program mapping quality of service in a first communication network to quality of service in a second communication network;
  transmitting the program from an exit node of the first network to an entry node of the second network in an active packet; and
  executing the program at the entry node of the second communication network.

The program may be generated at the exit node of the first communication network, or at an end-user node from which the active packet originates. Alternatively, part of the program, describing basic QoS requirements, may be generated at the end-user node, and another part of the program, describing QoS mapping methods, may be generated at the exit node of the first communication network.

When QoS practices in the second communication network are changed, the entry node of the second communication network may generate another program relating QoS information before and after the change, and this program may be invoked from the program sent by the exit node of the first communication network. Information describing the new QoS practices may also be inserted into an active packet sent from the second communication network to the first communication network.

The invention further provides apparatus for interconnecting the first and second communication networks, employing the invented QoS mapping method.

The invented method and apparatus are timely, because they exchange QoS information at just the times when the information is needed. They are efficient because they do not exchange Qo6 information at other times, and because QoS information can be coded efficiently in program form.

When the program in an active packet is generated partially or entirely at an end-user node, the end user gains control over the QoS mapping methods that will be employed as the active packet travels from one network to another.

DETAILED DESCRIPTION OF THE INVENTION

Embodiments of the invention will be described with reference to the attached drawings, in which like parts are indicated by like reference characters.

Figure 1:
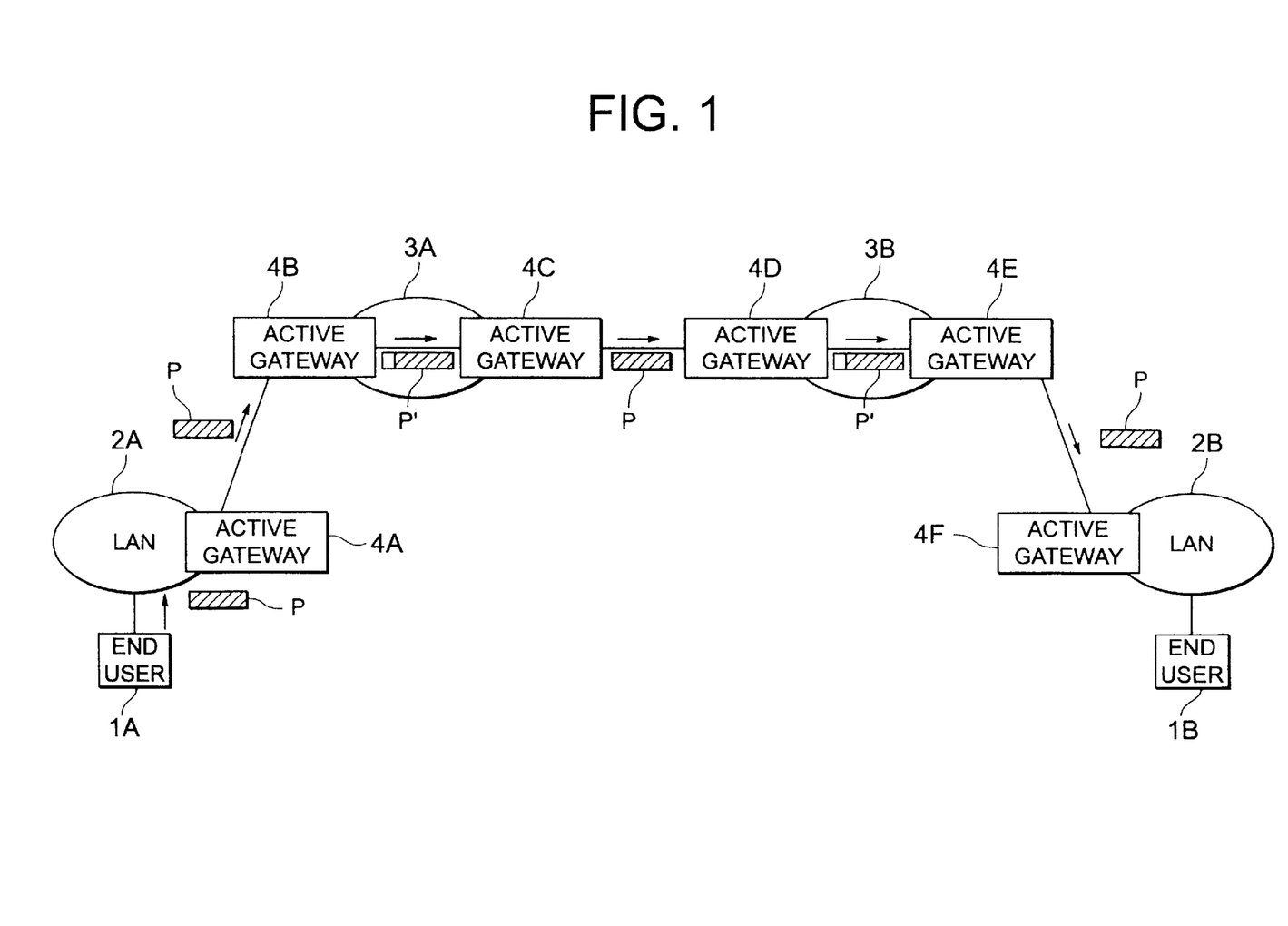
FIG. 1 is a network diagram illustrating a first embodiment of the invention.

Illustrating a first embodiment of the invention, FIG. 1 shows a communication link or connection between a pair of end-user nodes 1A, 1B served by respective local area networks (LANs) 2A, 2B. The LANs 2A, 2B are interconnected through a pair of intermediate networks 3A, 3B. The connection thus passes through four networks 2A, 3A, 3B, 2B. It will be assumed that each of these four networks has a different QoS system, involving, for example, a different protocol stack, different QoS parameters, and different methods of providing QoS guarantees, in different layers of the network architecture.

The networks are linked together through interconnecting apparatus referred to below as active gateways 4A, 4B, 4C, 4D, 4E, 4F. Each active gateway has functions, described below, that enable the active gateway to perform QoS mapping dynamically and adaptively, by using active packets P that are transmitted when a connection is set up.

Figure 2A:
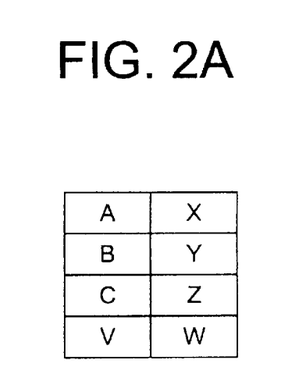
FIG. 2A shows an example of a QoS mapping table.
Figure 2B:
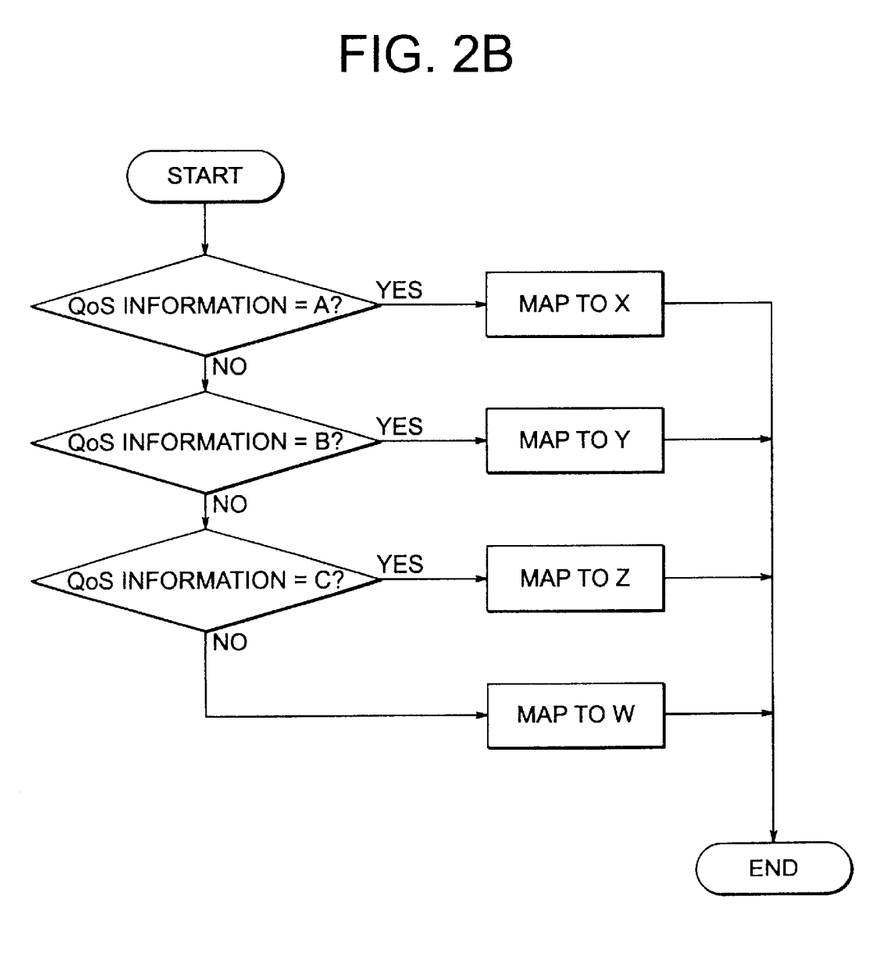
FIG. 2B is a flowchart of a QoS mapping program equivalent to the QoS mapping table in FIG. 2A.
Figure 3:
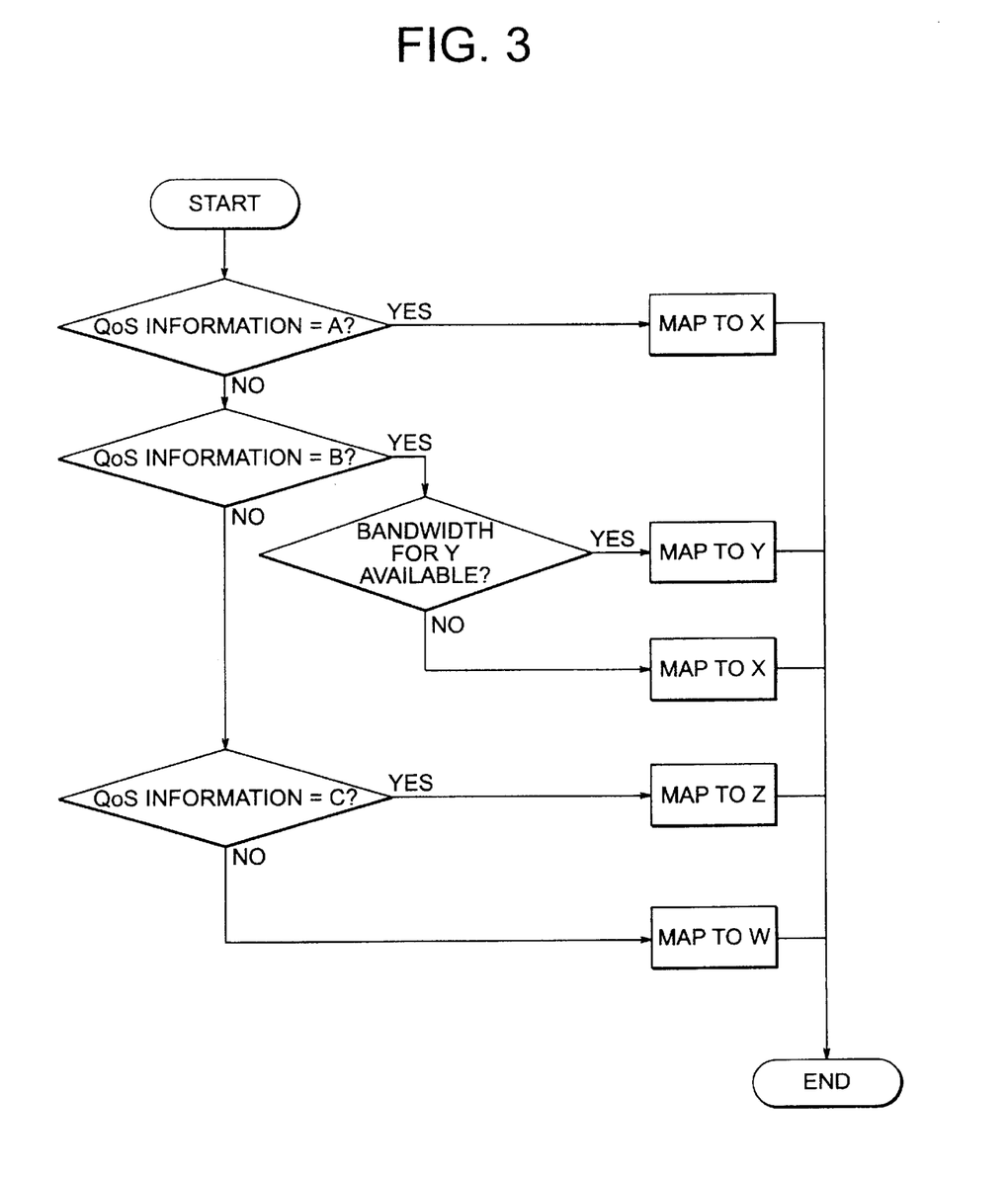
FIG. 3 is a flowchart showing an example of a more complex QoS mapping program.

The payload of an active packet P specifies QoS requirements and QoS mapping methods in the form of a program; that is, a set of rules or an algorithm. FIG. 2A shows a simple example of a QoS mapping table that relates QoS information A, B, C, V in one network to QoS information W, X, Y, Z in another network. FIG. 2B is a flowchart of a simple program that executes the same QoS mapping. FIG. 3 shows a more complex program, in which QoS information B is mapped to X or Y, depending on bandwidth availability. Active packets include programs like these, coded so as to be executable by the active gateways 4A–4F.

Each active gateway 4A–4F provides at least the following five functions: (i) execution of programs in active packets; (ii) transfer of active packets; (iii) security protection; (iv) intra-network resource management; and (v) timer supervision.

The program execution function (i) enables an active gateway to open an active packet P, execute the program included in the payload of the packet, and take action according to the execution results. The action taken includes, for example, managing the allocation of necessary resources in the network to which the active gateway belongs. QoS management operations in a network are thus managed in accordance with requirements and mapping methods programmed into active packets.

The active-packet transfer function (ii) enables an active gateway to transfer an active packet to an active gateway in another network, so that the active packet can enter the other network. In a network system having a backbone network, this function is used to transfer active packets to the backbone network.

The security protection function (iii) protects the system from possible damage by maliciously coded programs, by checking the safety of an active packet. If safety is confirmed, QoS mapping is carried out according to the execution results of the program in the packet. If the safety of the active packet cannot be confirmed, the programmed QoS mapping is not carried out.

The intra-network resource management function (iv) enables an active gateway to manage resources in its own network. This function may include existing techniques such as the resource reservation protocol (RSVP), and techniques used to guarantee QoS in networks employing the asynchronous transfer mode (ATM).

The timer supervision function (v) enables an active gateway to start a timer when it allocates resources needed to fulfill QoS requirements, and release the resources if no data packets are received within a predetermined time.

Next, the operation of the first embodiment in setting up a connection from end-user node 1A to end-user node 1B will be described. In this operation, active gateways 4A, 4C, 4E function as exit nodes of networks 2A, 3A, 3B, respectively. Active gateways 4B, 4D, 4F function as entry nodes of active gateways 3A, 3B, 2B, respectively.

When end-user node 1A requests a connection to end-user node 1B, end-user node 1A generates a program describing its QoS requirements and the QoS mapping methods to be employed. Under QoS requirements, the program specifies, for example, traffic parameters and other QoS parameters. The program is placed in an active packet P, which is encapsulated for transmission through LAN 2A. The encapsulated active packet P' is sent through LAN 2A to active gateway 4A. Active gateway 4A extracts the active packet from its capsule, and transfers the active packet P to active gateway 4B in intermediate network 3A.

Active gateway 4B extracts the program from the active packet P, executes the program, and uses the security protection function to check the safety of the execution results. If the execution results fail the security check, active gateway 4B returns an error message, reporting that the connection cannot be set up, for example. Active gateway 4A relays this error message to the source of the active packet, that is, to end-user node 1A.

If the execution results pass the security check, active gateway.4B takes action according to the execution results, negotiating for resources in network 3A to satisfy the programmed QoS requirements. If network 3A currently lacks the resources needed to provide the required quality of service, active gateway 4B returns an error message through active gateway 4A to end-user node 1A.

If the requirements can be met, then besides allocating the necessary network resources, active gateway 4B encapsulates the received active packet P for transmission across network 3A to the active gateway 4C that links network 3A to the packet's next destination, which is intermediate network 3B. Active gateway 4C extracts the active packet P from the encapsulated active packet P', and transfers the active packet P to network 3B.

A similar process is now repeated in network 3B. Active gateway 4D extracts the program from the active packet P, executes it, and performs a security check. If the execution results fail the security check, or if the programmed QoS requirements cannot be met, active gateway 4D does not allocate any resources in network 3B, but returns an error message to network 3A. In network 3A, active gateway 4B takes security-protection action as necessary, then releases the resources that it had reserved to guarantee the requested QoS, and sends the error message onward toward end-user node 1A.

If the execution results pass the security check at active gateway 4D and the QoS requirements can be met, active gateway 4D allocates the necessary resources, and encapsulates the active packet P for transmission across network 3B to active gateway 4E. Active gateway 4E extracts the active packet P from the encapsulated packet P', and sends the active packet P to LAN 2B.

The active packet P is received by active gateway 4F in LAN 2B. Active gateway 4F also executes the program in active packet P, performs a security check, and returns an error message if the security check fails or the programmed QoS requirements cannot be met. If the security check passes and the requirements can be met, active gateway 4F takes action according to the execution results, and returns a message indicating, for example, that the requested quality of service has been guaranteed, and communication is possible. This message is returned through networks 3B, 3A, and 2A to end-user node 1A.

After receiving this confirmation message from active gateway 4F, end-user node 1A waits for a response from end-user node 1B, confirming that the connection has been set up, and then begins communicating with end-user node 1B.

When active gateways 4B, 4D, 4F allocate network resources to guarantee the requested quality of service, they also start respective timers. If end-user node 1B does not respond, or if for some other reason no data packets are transferred between end-user nodes 1A and 1B before the timers time out, the timer supervision function detects this and releases the allocated resources.

In the process described above, there is no need to collect and track QoS information for all networks at any one central location. Each active gateway only has to execute the program in a received active packet in terms of the QoS information pertaining to its own network. QoS mapping management is thus greatly simplified.

Compared with conventional QoS mapping tables, the programs used in the first embodiment provide a simple way to express QoS mapping patterns and form combinations of these patterns. QoS requirements and mapping methods can thus be coded efficiently.

Furthermore, QoS information is transferred from one network to another only when it is needed, so network bandwidth is not consumed unnecessarily.

A further advantage is that since the active packet P is generated at the end-user node, the user can specify QoS mapping methods tailored to the user's individual requirements.

Similarly, each network can introduce new QoS technology at its own convenience, without having to obtain the cooperation of other networks, because changes in QoS mapping methods in one network have no effect on QoS mapping in other networks. A network only has to assure that its own active gateways will be able to execute the QoS mapping programs that arrive in active packets.

For the same reason, the program in the active packet provides an end-to-end QoS guarantee that is not subject to unintended modifications as QoS requirements and methods are mapped from one network to another.

Another advantage is that, since the QoS mapping method is specified each time a connection is set up, the protocol stacks employed in the networks can be optimized for each connection individually. For example, if a connection does not require retransmission of packets that fail to reach their destination, or if retransmission is not possible, the retransmission layer (e.g., the transmission control protocol or TCP layer) can be eliminated from the connection.

Although the preceding description referred to a single active packet, QoS program code may be sent in a plurality of active packets. In this case, the security function is applied to the first active packet, but may be omitted for subsequent active packets.

Figure 4:
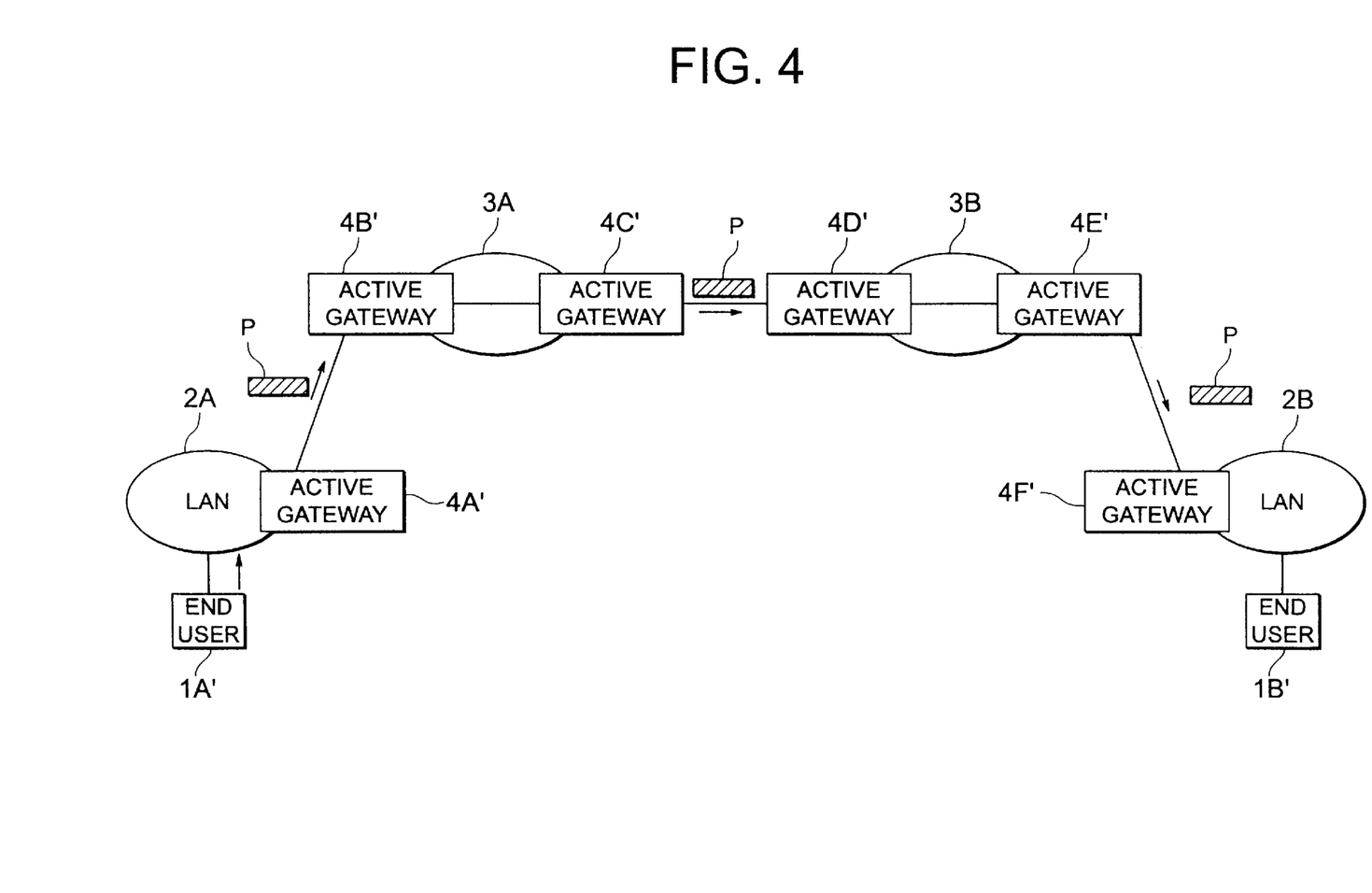
FIG. 4 is a network diagram illustrating a second embodiment of the invention.

Next, a second embodiment will be described. Like the first embodiment, the second embodiment will be described with reference to a connection passing through LANs 2A, 2B and intermediate networks 3A, 3B, as shown in FIG. 4.

The purpose of the second embodiment is to provide optimum QoS mapping without requiring programming at the end-user nodes. The functions of the end-user nodes 1A', 1B' and active gateways 4A'–4F' therefore differ somewhat from the functions of the end-user nodes and active gateways in the first embodiment. One difference is that the active packet P used to set up a connection from end-user node 1A' to end-user node 1B' is originally generated by the active gateway 4A' in LAN 2A, instead of being generated at the end-user node 1A'.

To connect with end-user node 1B', end-user node 1A' generates a conventional passive packet, which is received by active gateway 4A' in LAN 2A. Active gateway 4A' then generates program code specifying traffic parameters, QoS parameters, and other QoS requirements, and further program code specifying the QoS mapping method. This further program code describes the QoS scheme used in LAN 2A, the resource reservation protocol (RSVP, for example), the protocol stack, and other necessary information. Active gateway 4A' sends the generated program code in an active packet P to active gateway 4B' in intermediate network 3A.

Active gateway 4B' extracts the program code from the received active packet P, executes the program, and performs a security check on the execution results. If the security check passes, active gateway 4B' negotiates for the necessary resources, specified by the execution results, in network 3A. If the security check fails, or if it passes but the resources cannot be acquired, an error message is returned to end-user node 1A' as in the first embodiment.

If the security check passes and the necessary resources are available, active gateway 4B' allocates the resources, but does not encapsulate active packet P or send it to active gateway 4C'. Instead, using conventional procedures, active gateway 4B' notifies active gateway 4C' of the results of the QoS mapping and resource allocations.

Having been notified of these results, active gateway 4C' constructs a new QoS mapping program, again specifying QoS requirements and mapping methods, including traffic parameters, QoS parameters, the QoS scheme in network 3A, a resource reservation protocol, a protocol stack, and other necessary information. Active gateway 4C' places the new program code in a new active packet P, which is sent to active gateway 4D' in intermediate network 3B.

The same process is now repeated in network 3B. Active gateway 4D' extracts and executes the program generated by active gateway 4C', performs a security check on the execution results, negotiates for resources in network 3B if the security check passes, and either returns an error message to active gateway 4C', if the security check fails or the requirements cannot be met, or takes action according to the execution results and notifies active gateway 4E'. In the former case, when the error message reaches active gateway 4B', active gateway 4B' releases the resources that were reserved in network 3A, and sends the error message on toward end-user node 1A'. In the latter case, active gateway 4D' notifies active gateway 4E' by conventional methods, and active gateway 4E' constructs yet another QoS mapping program, describing QoS requirements and mapping methods. Active gateway 4E' sends this program to active gateway 4F' in another active packet P.

Upon receiving the active packet P generated by active gateway 4E', active gateway 4F' extracts and executes the included program code, performs a security check, and either returns an error message, if the security check fails or the requirements cannot be met, or takes action according to the execution results and returns a message confirming readiness for communication. Upon receiving the confirmation message, end-user node 1A' waits for a response from end-user node 1B', then begins communicating.

Active gateways 4B', 4D', and 4F' also start timers when they allocate network resources, and release the allocated resources if no data traffic is received within a predetermined time, as in the first embodiment.

The second embodiment has substantially the same effects as the first embodiment, except that it does not give an end-user node the capability to program the QoS requirements and mapping method directly. This is a disadvantage in some cases, but an advantage in other cases, particularly for end-user nodes that cannot easily generate QoS program code.

Next, a third embodiment will be described.

Figure 5:
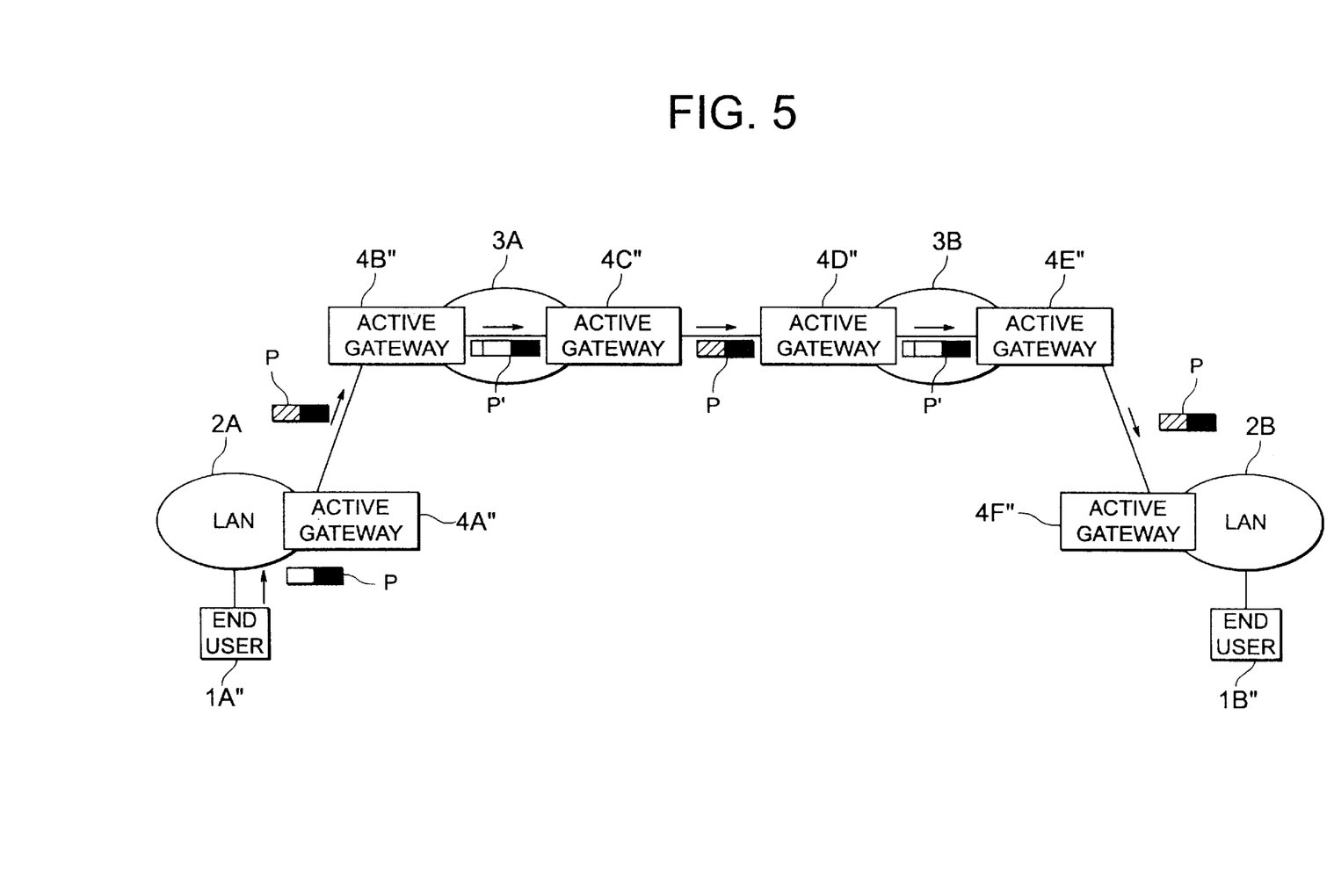
FIG. 5 is a network diagram illustrating a third embodiment.

Referring to FIG. 5, the third embodiment comprises end-user nodes 1A", 1B" and active gateways 4A", 4B", 4C", 4D", 4E", 4F" operating in LANs 2A, 2B and intermediate networks 3A, 3B. Active packets P are sent generally as described in the first embodiment.

Figure 6:
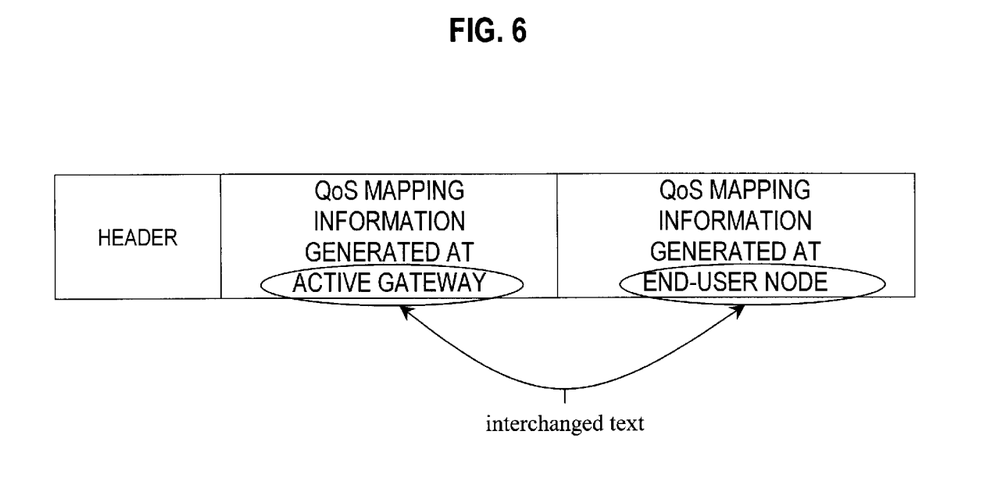
FIG. 6 illustrates an active packet sent in the third embodiment.

In the third embodiment, the program in an active packet includes program code generated at the end-user node, specifying basic QoS requirements, and additional program code generated at the exit gateway of each network, specifying QoS mapping information for use in the next network. A typical active packet thus comprises a header, QoS mapping information generated at the end-user node, and QoS mapping information generated at an active gateway, as shown in FIG. 6.

To connect with end-user node 1BR, end-user node 1A" codes its basic QoS requirements in a program giving, for example, traffic parameters and QoS parameters, places this program in an active packet P, encapsulates the active packet P, and sends the encapsulated packet to active gateway 4A".

Active gateway 4A" extracts the encapsulated active packet, and adds further program code specifying, for example, the QoS scheme used in network 2A, a resource reservation protocol such as RSVP, a protocol stack, and other information necessary for QoS mapping. The added program code is indicated by hatching in the drawing. Active gateway 4A" sends the active packet, with the program code supplied by end-user node 1A" and the additional code, to active gateway 4B" in network 3A.

Active gateway 4B" extracts and executes the program in active packet P, performs a security check on the execution results, and negotiates for resources in network 3A if the security check passes. If the security check fails, or if the QoS requirements cannot be met, an error message is returned via active gateway 4A" and LAN 2A to end-user node 1A". If the security check passes and the requirements can be met, active gateway 4B" allocates resources in network 3A, removes the program code that was added by active gateway 4A" from active packet P, encapsulates the remaining basic-requirements code that was generated at end-user node 1A", and sends the encapsulated active packet P' to active gateway 4C". Active gateway 4C" extracts the encapsulated program code and adds further program code specifying specific QoS mapping methods, then sends an active packet with the basic program code and the added program code to active gateway 4D" in network 3B.

The same process is now carried out in network 3B, resulting in the return of an error message if the security check performed by active gateway 4D" fails, or if required resources are not available. In this case, the resources allocated in network 3A are released by active gateway 4B", after security protection processing.

If the security check at active gateway 4D" passes and the necessary resources are available, a new active packet P, including the basic program code generated by end-user node 1A" and further program code added by active gateway 4E", is sent to LAN 2B. Active gateway 4F" executes the program in this active packet P, and performs a security check on the execution results. If this check passes, and the QoS requirements can be met, active gateway 4F" returns a confirmation message through networks 3B, 3A, and 2A to enduser node 1A". End-user node 1A" then waits to receive a reply from end-user node 1B", after which communication begins.

As in the first two embodiments, active gateways 4B", 4D", 4F" start timers when they allocate resources, and release the allocated resources if no data communication packets are received before the timers time out.

The third embodiment enables an end-user node to present its basic QoS requirements, coded in the form of a program, without requiring the end-user node to specify how these QoS requirements are to be mapped onto the QoS schemes employed in other networks.

Since the program encoding the basic QoS requirements remains unchanged as it travels from one network to another, end-to-end quality of service is reliably guaranteed.

Next, a fourth embodiment will be described.

Figure 7:
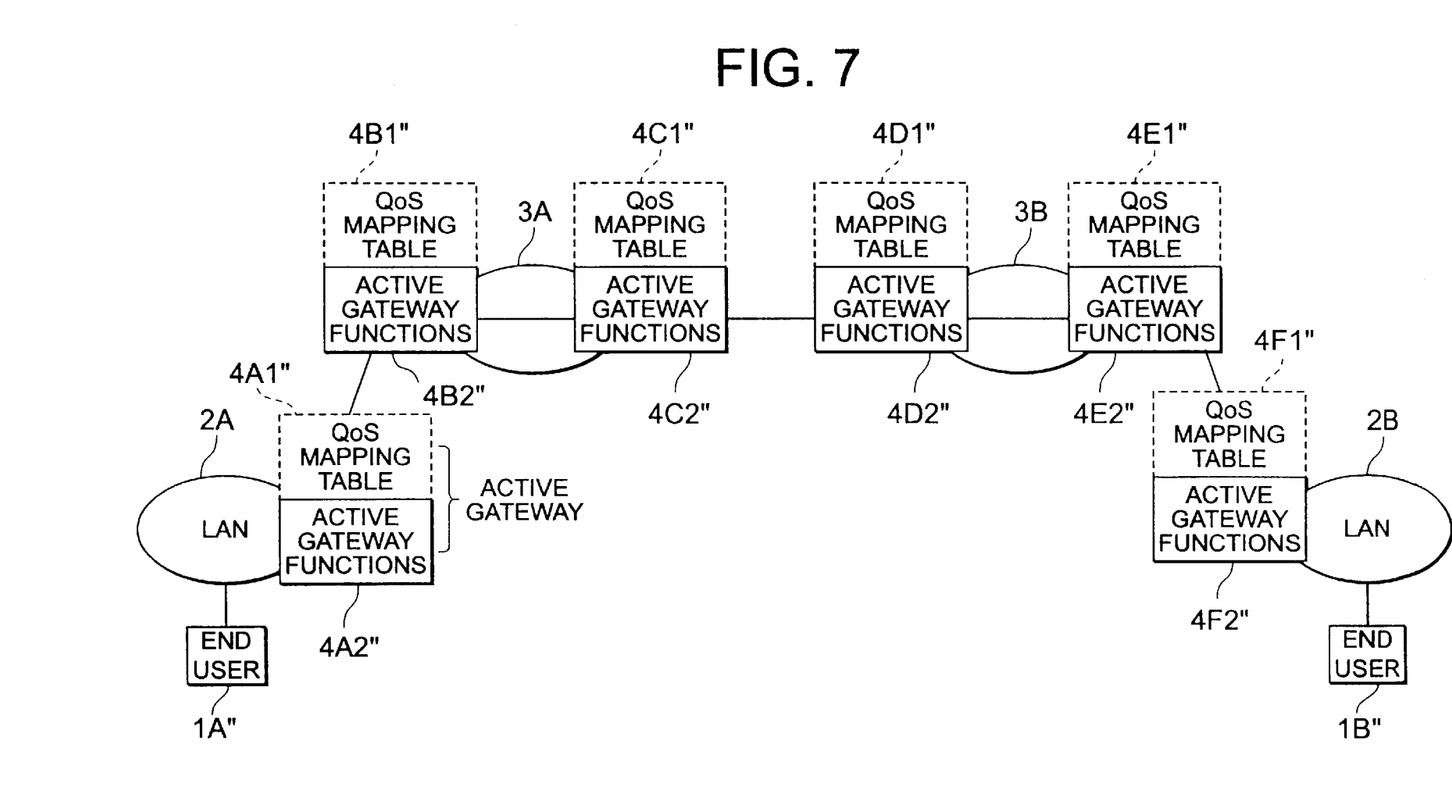
FIG. 7 is a network diagram illustrating a fourth embodiment of the invention.

Referring to FIG. 7, the fourth embodiment differs from the preceding embodiments in that each active gateway has both active gateway functions and a conventional QoS mapping table. The active gateway functions include the functions described in the third embodiment. Each active gateway also has two additional functions: (vi) a QoS mapping table updating function; and (vii) a QoS mapping function that employs the QoS mapping table. The QoS mapping table updating function adds the results of execution of a program included in an active packet P to the QoS mapping table, if these results are not already present in the QoS mapping table.

When a connection is set up, the originating end-user node (e.g., node 1A") generates an active packet P, which is transmitted through networks 2A, 3A, 3B, 2B as in the third embodiment. The entry gateways of networks 3A, 3B, 2B first attempt to perform QoS mapping according to their conventional QoS mapping tables 4B1", 4D1", 4F1". If the QoS mapping requirements can be met in this way, these gateways do not execute the program in the active packet P.

If the QoS mapping requirements cannot be met by use of the conventional QoS mapping tables, active gateway functions 4B2", 4D2", 4F2" are used to execute the program in the active packet P as described in the third embodiment, and add the execution results to the QoS mapping tables 4B1", 4D1", 4F1", provided the results pass the security checks and are not already present in the QoS mapping table.

Active gateway functions 4C2" and 4E2" are also used to replace the part of the QoS mapping program that was not generated by end-user node 1A" with new program code, as explained in the third embodiment.

QoS mapping by use of a conventional QoS mapping table is a look-up process that takes less time than execution of a program in an active packet and checking of the results. By employing the conventional QoS mapping table whenever possible, the fourth embodiment shortens the QoS mapping process, as compared with the third embodiment. By adding program execution results to the QoS mapping table, the fourth embodiment avoids the need to execute the same program code repeatedly when it appears in different active packets.

In a variation of the fourth embodiment, when executing program code in active packets, the active gateways operate as described in the first embodiment or second embodiment instead of the third embodiment.

Next, a fifth embodiment will be described. The fifth embodiment is an active gateway or gate node that implements active QoS mapping in an ATM network. Existing methods are used to guarantee quality of service within the ATM network, so that the active gate node can be introduced without having an impact on network functions.

Figure 8:
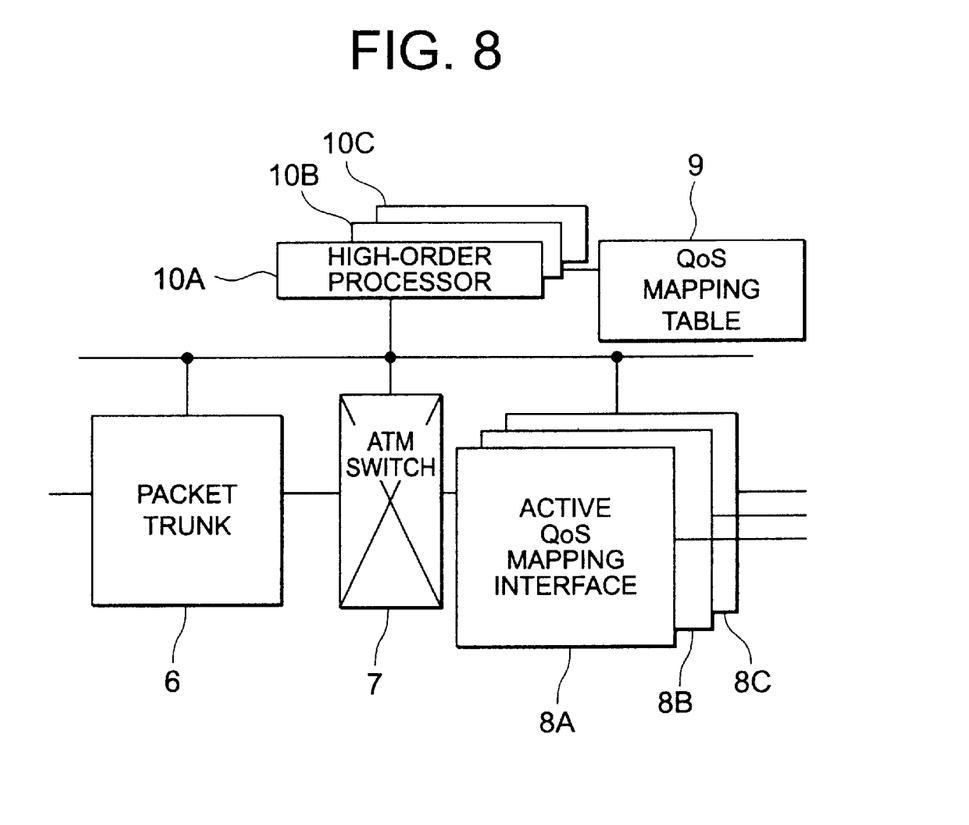
FIG. 8 is a block diagram of an active gateway in a network employing an asynchronous transfer mode, illustrating a fifth embodiment of the invention.

Referring to FIG. 8, the active gate node comprises a packet trunk 6 that carries out QoS negotiations within the ATM network, an ATM switch 7, and a plurality of active QoS mapping interfaces 8A, 8B, 8C that perform QoS mapping between the ATM network and three other networks (not visible). These components operate physically as separate functional blocks. There is also a QoS mapping table 9 managed by a plurality of higher-order processors 10A, 10B, 10C.

Next, the operation of the fifth embodiment will be described. When a connection that passes through the ATM network is set up, the active gateway at which the connection enters the ATM network will be referred to as the upstream node or entry node, and the active gateway at which the connection leaves the ATM network will be referred to as the downstream node or exit node. Both nodes have the structure shown in FIG. 8. The operations of the two nodes will be described separately.

The entry node receives two types of QoS mapping requests from other networks. One is a request for conventional QoS mapping by use of the QoS mapping table 9. This type of request is handled in the conventional way. The other type of request is a request for active QoS mapping, arriving in the form of an active packet P. This request is handled by one of the active QoS mapping interfaces 8A, 8B, 8C, which executes the program included in the active packet and performs a security check on the results. If the security check passes, the packet trunk 6 performs the necessary negotiations for ATM network resources, while one of the high-order processors 10A, 10B, 10C adds the execution results to the QoS mapping table 9. If the necessary resources are obtained, the program code that was created by the end-user node is encapsulated and sent to the exit node.

The exit node operates as in the third embodiment when it receives an encapsulated active packet P', and as in the second embodiment when it does not receive such an encapsulated packet. In the former case, the relevant one of the active QoS mapping interfaces 8A, 8B, 8C generates program code describing the active QoS mapping method, adds this program code to the program already present in the active packet, giving basic QoS requirements, and sends the active packet to an active gateway in the next network. In the latter case, the active QoS mapping interface generates program code describing both QoS requirements and mapping methods, places the program code in an active packet, and sends the active packet to the active gateway in the next network.

The fifth embodiment enables active QoS mapping to be carried out in an ATM network, by adding interface functions to the network, without modifying the QoS scheme in the ATM network itself.

Next, a sixth embodiment will be described. This embodiment enables QoS mapping to continue in a network when the QoS scheme in the network is changed during system operation, without affecting other networks.

Figure 9:
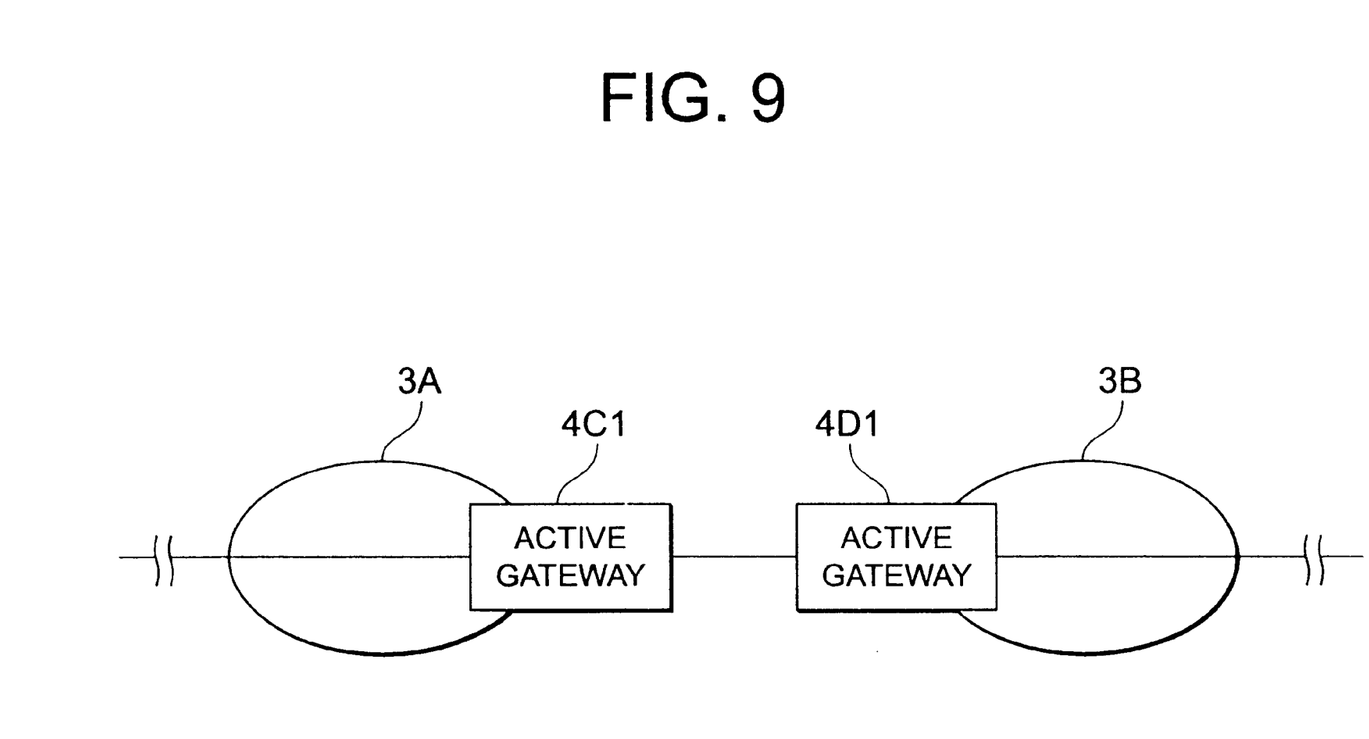
FIG. 9 is a network diagram illustrating sixth and seventh embodiments of the invention.

Referring to FIG. 9, the sixth embodiment will be described in relation to a pair of active gateways 4C1, 4D1 in the intermediate networks 3A, 3B shown in the earlier embodiments. These active gateways 4C1, 4D1 have the further function of generating and executing internal programs that reflect changes in QoS practices in their own networks, when such changes occur. These internal programs are different from the QoS active mapping programs that were described in the preceding embodiments. It will be assumed that the active packets P described in the preceding embodiments are generated in the active gateways.

Next, the operation of the sixth embodiment will be described, for the case in which the QoS practices in network 3A are changed. A typical change might occur when a new protocol version is installed, for example.

Figure 10:
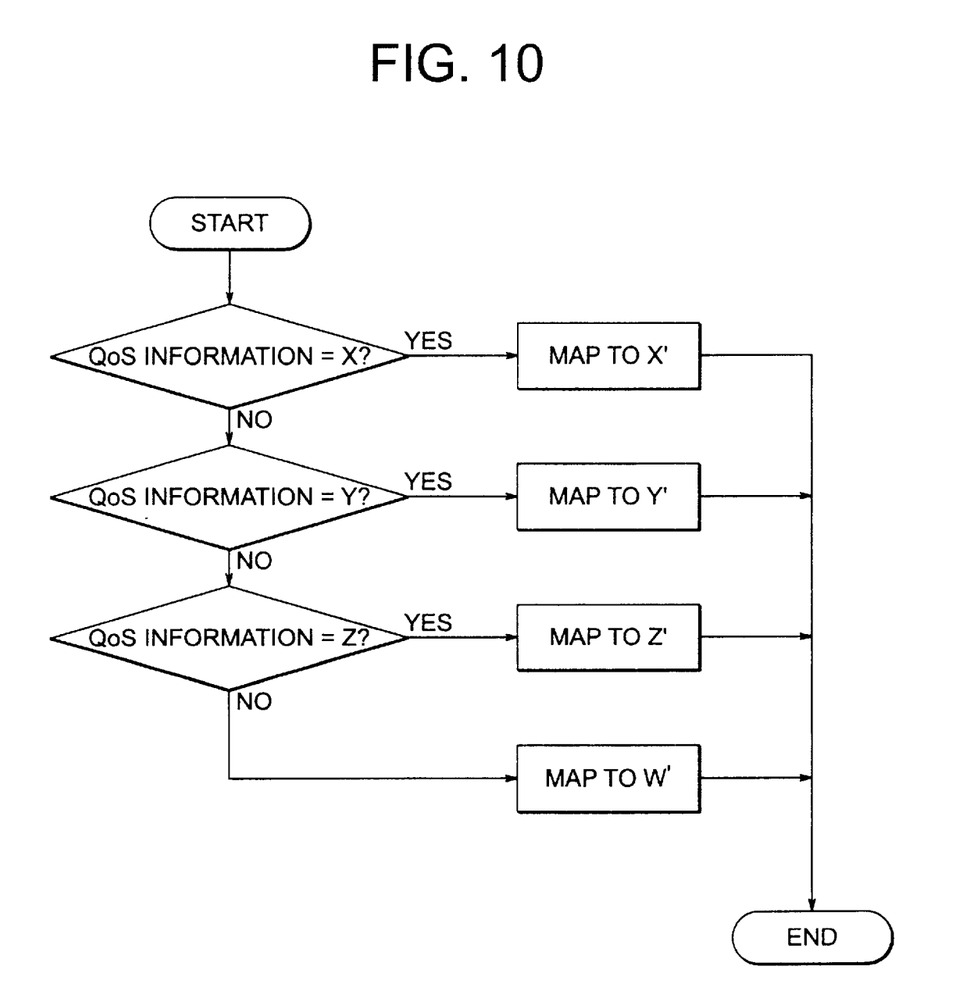
FIG. 10 is a flowchart of a QoS mapping program used in the sixth and seventh embodiments.

First, in preparation for the arrival of active packets P from other networks, active gateway 4C1 generates a mapping program such as the one shown in FIG. 10, relating QoS information before the change to QoS information after the change in network 3A. This program is not sent to any other networks, but may be invoked when an active packet P is received from another network.

Figure 11:
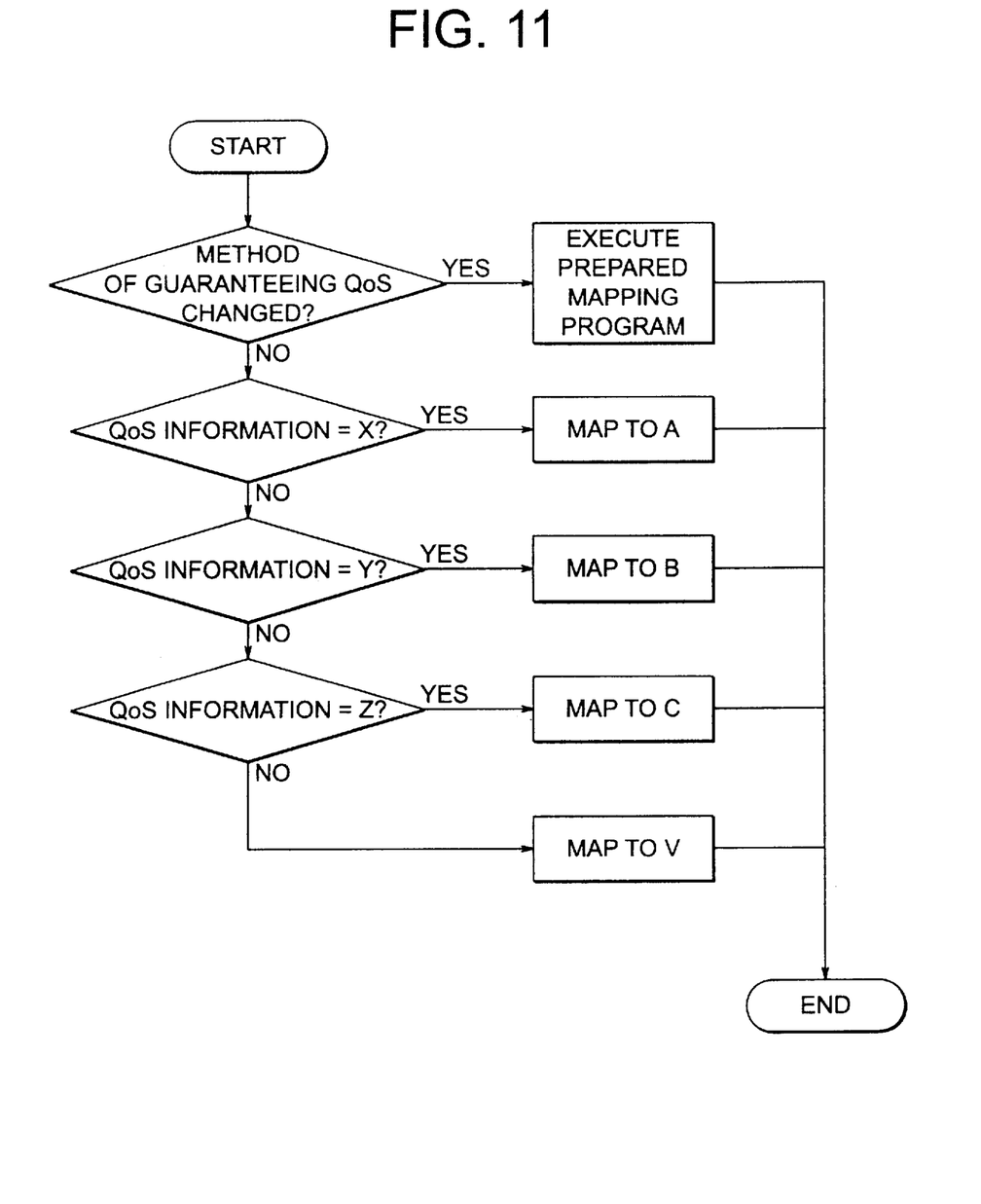
FIG. 11 is a flowchart of another QoS mapping program used in the sixth embodiment.

After these preparations, active gateway 4C1 may receive an active packet including the program shown in FIG. 11 from active gateway 4D1 in network 3B. As the first step in the execution of this program, active gateway 4C1 decides whether or not the method of guaranteeing QoS in network 3A has been changed. In the present case the method has been changed, so the prepared program in FIG. 10 is executed, and mapping is performed according to the changed conditions. If no change has occurred, then QoS mapping is carried out according to the other steps of the program in FIG. 11 supplied by active gateway 4D1 in network 3B.

Figure 12:
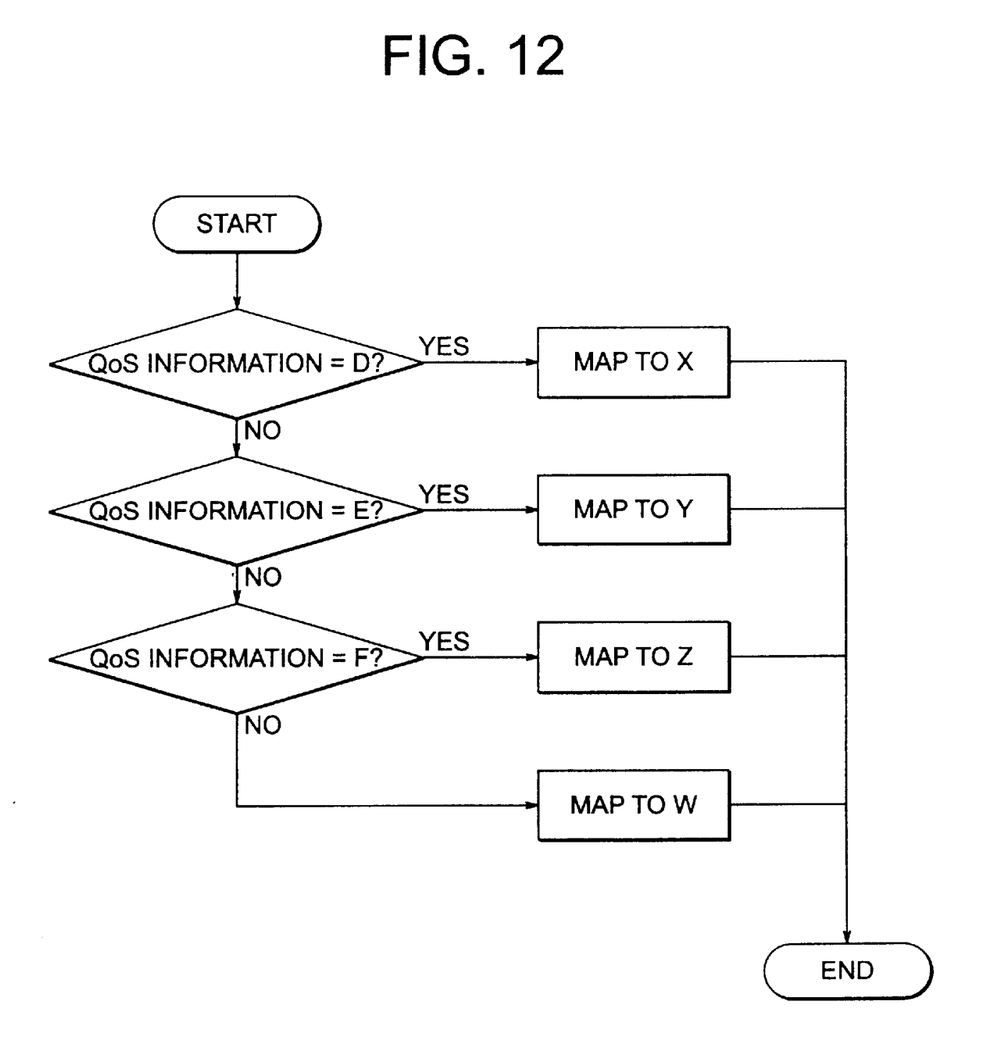
FIG. 12 is a flowchart of another QoS mapping program used in the sixth embodiment.

After the change in QoS practices in network 3A, active gateway 4C1 may generate an active packet P including the QoS mapping program shown in FIG. 12, and send this active packet P to active gateway 4D1" in network 3B. Active gateway 4D1 executes the program shown in FIG. 12, which includes the most recent QoS information pertaining to network 3A.

For the sake of simplicity, the program in FIG. 12 does not take account of changes in QoS practices that may occur in the destination network (network 3B). This program may be modified, however, to include an initial step like the one in FIG. 11, that calls upon active gateway 4D1 to decide whether the method of guaranteeing QoS in network 3B has been changed, and to execute a prepared internal mapping program if such a change has taken place.

The sixth embodiment enables QoS mapping to be carried out correctly despite changes in QoS practices within a network. This enables each network to introduce the latest QoS technology easily, since changes in the QoS scheme in each network are not restricted by the behavior of other networks. Furthermore, when the QoS scheme in a network is changed, other networks can obtain correct QoS mapping without being notified of the change.

Next, a seventh embodiment will be described. The seventh embodiment differs from the sixth embodiment in that when QoS practices in a network are changed, the new QoS information is inserted in active packets sent to other networks, to ensure that QoS mapping will be carried out correctly. The seventh embodiment will be described with reference to FIGS. 9 and 10.

If, for example, the method of guaranteeing QoS in network 3A in FIG. 9 is changed, then active gateway 4C1 prepares a program like the one shown in FIG. 10, relating the QoS information before and after the change. In addition, when active gateway 4C1 sends an active packet P" to active gateway 4D1 in the course of setting up a connection, for example, active gateway 4C1 inserts information describing the change in QoS practices in network 3A into this active packet P". The additional information in active packet in this P" states, for example, that the QoS scheme in network 3A has been changed, and QoS will be carried out according to new QoS information (described by the mapping program in FIG. 10).

Upon receiving this active packet P", active gateway 4D1 updates the information it holds describing the QoS scheme in network 3A. This information is stored in a memory facility (not visible) in active gateway 4D1. Thereafter, when active gateway 4D1 generates active packets P" for transmission to network 3A, these active packets will be generated according to the updated information describing the new QoS scheme in network 3A.

After sending this notification, if active gateway 4C1 in network 3A recognizes the reception of an active packet P" generated on the basis of the updated QoS information, it carries out QoS mapping without executing the prepared program shown in FIG. 10. In addition, once active gateway 4C1 recognizes that active gateway 4D1 and any other active gateways to which active gateway 4C1 is connected have updated their information describing the QoS scheme of network 3A, active gateway 4C1 deletes the prepared mapping program shown in FIG. 10, since this program is no longer needed.

It may happen that the QoS schemes in both networks 3A and 3B are changed simultaneously. In this case, QoS mapping becomes temporarily impossible, because neither active gateway 4C1 or 4D1 knows the QoS scheme currently used in the other network. Accordingly, it is not possible to exchange new QoS information and perform QoS mapping at the same time. First, the two active gateways 4C1, 4D1 must exchange QoS information; QoS mapping is performed afterward.

Active packets P" are still used to exchange QoS information in this case. For example, active gateway 4D1 generates an active packet P" including a QoS mapping program based on the new QoS information in network 3B and the old QoS information in network 3A, and sends this active packet P" to active gateway 4C1. Active gateway 4C1 cannot use the program in this active packet P" to perform QoS mapping, but it obtains the latest QoS information pertaining to network 3B from this active packet, and the information about network 3B stored in active gateway 4C1 is updated accordingly. Active gateway 4C1 now generates an active packet P" with the latest QoS information pertaining to network 3A, and sends this active packet P" to active gateway 4D1.

When this active packet P" is received by active gateway 4D1, the QoS information about network 3A stored in active gateway 4D1 is updated. At this point, both active gateways 4C1, 4D1 possess the latest QoS information about both networks 3A, 3B. Active gateway 4D1 now sends another active packet P" to active gateway 4C1, including a QoS mapping program based on correct information about the QoS scheme in network 3A. Active gateway 4C1 executes this program and carries out QoS mapping.

When the QoS scheme is changed in only one network at a time, the seventh embodiment enables information describing the change to be inserted efficiently into an active packet P" that is sent to a connected network for another purpose, such as setting up a connection. No packets have to be sent and received solely for the purpose of exchanging QoS information.

The invention is not restricted to the network system illustrated in the drawings, having two LANs and two intermediate networks. The invention can be practiced in any network system having two or more constituent networks with different QoS practices.

The programs included in the active packets need not be similar to the programs illustrated by flowcharts in the drawings. Any type of program that implements QoS mapping functions can be used.

The interconnecting apparatus in the preceding embodiments was an active gateway, but the invention can also be practiced in other types of interconnecting apparatus, such as routers.

Those skilled in the art will recognize that further variations are possible within the scope claimed below.

What is claimed is:

1. A method of mapping quality of service in a first communication network to quality of service in a second communication network, comprising the steps of:
   generating a first program for mapping said quality of service in the first communication network to said quality of service in the second communication network;
   transmitting the first program from an exit node of the first communication network to an entry node of the second communication network in an active packet; and
   executing the first program at the entry node of the second communication network.

2. The method of claim 1, further comprising the steps of:
   encapsulating the first active packet at the entry node of the second communication network;
   transmitting the encapsulated first active packet across the second communication network, to an exit node of the second communication network; and
   transmitting the first active packet from the exit node of the second communication network to an entry node of a third communication network.

3. The method of claim 1, wherein the first program is generated at the exit node of the first communication network.

4. The method of claim 3, wherein the first program is generated in response to notification from an entry node of the first communication network, when the entry node of the first communication network receives a second active packet from a third communication network.

5. The method of claim 3, wherein the first program is generated by adding second program code describing quality-of-service mapping methods to first program code, received from an entry node of the first communication network, originating at an end-user node, describing quality-of-service requirements.

6. The method of claim 5, further comprising the steps of:
   removing the second program code from the first program at the entry node of the second communication network;
   encapsulating the first program code at the entry node of the second communication network; and
   transmitting the encapsulated first program code across the second communication network to an exit node of the second communication network.

7. The method of claim 3, further comprising the steps of:
   adopting a new method of guaranteeing quality of service in the first communication network; and
   inserting information describing the new method of guaranteeing quality of service in the first communication network into the first active packet when the first active packet is sent to the entry node of the second communication network.

8. The method of claim 3, further comprising the steps of:
   adopting a new method of guaranteeing quality of service in the second communication network; and generating a second program in the second communication network, relating the new method of guaranteeing quality of service to a previous method of guaranteeing quality of service in the second communication network.

9. The method of claim 8, wherein the first program includes a step invoking the second program, causing the second program to be executed in the second communication network.

10. The method of claim 1, further comprising the step of mapping said quality of service in the first communication network to said quality of service in the second communication network by using a look-up table, if possible, the look-up table being used in preference to the first program.

11. The method of claim 10, further comprising the step of updating the look-up table according to execution results of the first program.

12. An apparatus disposed in a first communication network having a first method of guaranteeing quality of service, for interconnecting the first communication network to a second communication network having a second method of guaranteeing quality of service, comprising:

an active interface for mapping said quality of service in the second communication network to said quality of service in the first communication network by executing a first program received in a first active packet from the second communication network.

13. The apparatus of claim 12, wherein the apparatus also encapsulates the first active packet for transmission across the first communication network.

14. The apparatus of claim 12, wherein the apparatus also generates a second program for mapping said quality of service in the first communication network to said quality of service in the second communication network, and sends the second program to the second communication network in a second active packet.

15. The apparatus of claim 14, wherein the apparatus generates the second program in response to notification received from within the first communication network, when the first communication network receives a third active packet from a third communication network.

16. The apparatus of claim 14, wherein the apparatus generates the second program by adding program code describing quality-of-service mapping methods to program code, received from within the first communication network, originating at an end-user node, describing quality-of-service requirements.

17. The apparatus of claim 16, wherein the first active packet includes first program code describing quality-of-service requirements and second program code describing quality-of-service mapping methods, and the apparatus removes the second program code from the first active packet, then encapsulates the first active packet for transmission across the first communication network.

18. The apparatus of claim 14 wherein, if the first communication network has adopted a new method of guaranteeing quality of service, the apparatus inserts information describing the new method into the second active packet.

19. The apparatus of claim 14 wherein, when the first communication network adopts a new method of guaranteeing quality of service, the apparatus prepares a third program for mapping said quality of service in the first communication network before adoption of the new method to said quality of service in the first communication network after said adoption of the new method, and uses the third program to map said quality of service in the second communication network to said quality of service in the first communication network if the first active packet is received after said adoption of the new method.

20. The apparatus of claim 14, wherein the second program includes a step invoking a quality-of-service mapping program prepared in the second communication network, if the second communication network has adopted a new method of guaranteeing quality of service.

21. The apparatus of claim 12, further comprising means for mapping said quality of service in the second communication network to said quality of service in the first communication network by using a look-up table, if possible, the look-up table being used in preference to the first program.

22. The apparatus of claim 21, further comprising means for updating the look-up table according to execution results of the first program.

* * * * *